No. 867,651. PATENTED OCT. 8, 1907.
C. S. FRISHMUTH.
STOP AND WASTE COCK.
APPLICATION FILED JULY 15, 1905.
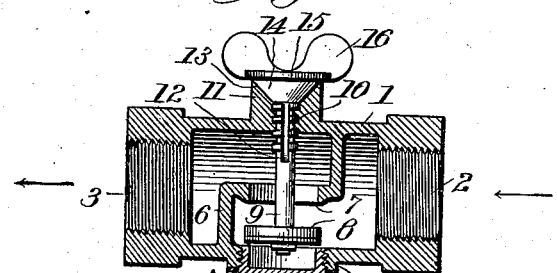
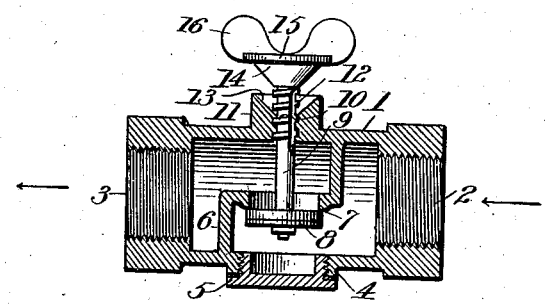
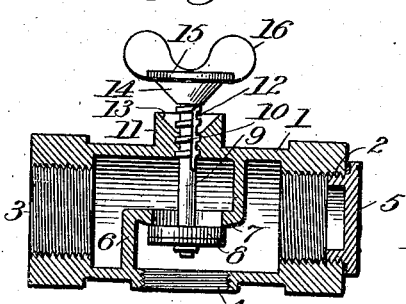
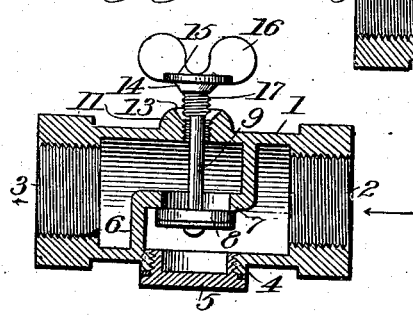
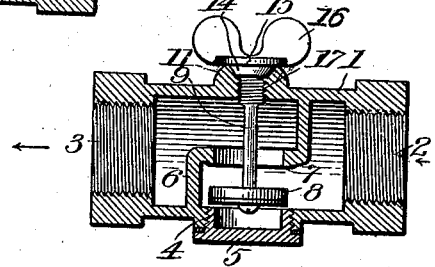
WITNESSES:
C. H. Walker,
Ada C. Briggs.
INVENTOR
Charles S. Frishmuth
By Wm. H. Finckel
Attorney

UNITED STATES PATENT OFFICE.

CHARLES S. FRISHMUTH, OF PHILADELPHIA, PENNSYLVANIA.

STOP AND WASTE COCK.

No. 867,651.　　　　Specification of Letters Patent.　　　　Patented Oct. 8, 1907.

Application filed July 15, 1905. Serial No. 269,860.

*To all whom it may concern:*

Be it known that I, CHARLES S. FRISHMUTH, a citizen of the United States, residing at Philadelphia, in the county of Philadelphia and State of Pennsylvania, have invented a certain new and useful Improvement Stop and Waste Cocks, of which the following is a full, clear, and exact description.

This invention is a self-draining valve, adapted to take the place and subserve the purposes of what is commercially known as a stop and waste cock.

The valve is applied in a line of pipe through which fluid passes, and is designed to permit and to arrest the flow of the fluid, and when arresting the flow it automatically drains off any fluid in the pipe beyond it.

The invention consists of a disk valve, seated in a shell, and having a secondary valve arranged outside of the shell and on the stem of the disk-valve and controlling automatically a draining port or waste nipple as the disk-valve is opened and closed, the drainage escaping along a reduced portion of the stem, substantially as I will proceed now more particularly to set forth and claim.

In the accompanying drawings illustrating the invention, in the several figures of which like parts are similarly designated, Figure 1 is a longitudinal section, with the disk valve opened and the secondary valve closed. Fig. 2 is a similar view with the disk valve closed and the secondary valve opened. Fig. 3 is a view similar to Fig. 2, but showing the valve arranged as an angle valve. Fig. 4 is a longitudinal section showing a valve closed by pressure of the fluid. Fig. 5 is a longitudinal section of the valve of Fig. 4, positively opened for the passage of the fluid.

The shell 1 has the inlet 2 and outlet 3 for connection in a straight line of pipe, and a nipple 4 in its bottom for use as an angle valve. When used in a straight line of pipe, as in Figs. 1, 2, 4 and 5, the nipple 4 is closed by a screw-plug 5, and when used as an angle valve, as in Fig. 3, the plug is removed from nipple 4 and inserted in the inlet 2, and the nipple then becomes the inlet.

The shell is provided with a ported diaphragm 6 having a valve seat 7.

The disk 8 is supported next to the seat by a stem 9 projecting through the shell. As shown in Figs. 1, 2 and 3, this stem is provided with a screwthread 10 which engages a waste nipple 11 on the shell, and a groove 12 is formed in the stem longitudinally thereof. The mouth of nipple 11 is formed with a seat 13, and the valve stem is supplied with a secondary, preferably conical, valve 14, which may be a piece of packing material, such as rubber or rubber composition, arranged next to a disk or flange 15 of the handle 16. The valve 14, when in the open position, extends beyond and away from the shell and its seat, and is wholly exposed to view for inspection, and in this position the valve and the flange 15 serve as a deflector for the drainage water. This form of the cock is opened for the flow of fluid, by screwing inwardly the valve stem so as to unseat the disk 8 and hence uncover the port, as shown in Fig. 1; and by this operation the secondary valve 14 is seated and closes the nipple 11 against the escape of fluid at that point. When the flow is to be stopped, the valve stem is screwed outwardly so as to seat disk 8, and this operation, as seen in Figs. 2 and 3, unseats the secondary valve 14 and opens an outlet from the shell through the groove 12, so as to drain the pipe line. As the drainage escapes it is deflected by the secondary valve and flange 15, and so prevented from squirting out in a solid stream.

In Figs. 4 and 5 the parts are as before described, excepting that the disk 8 is seated by pressure of the fluid, and the stem has a screwthread 17 of considerably greater diameter than the remainder of the stem, and this screwthread is disengaged from the screwthreaded nipple to permit the disk 8 to seat under pressure, and to effect the opening of the draining nipple by the entrance of the smaller diameter portion of the stem therein, as shown in Fig. 4; the stem being screwed into and thereby closing the nipple when it is desired to open the valve for the flow of fluid, as in Fig. 5. In this construction the longitudinal groove in the stem is unnecessary, or, rather, it is replaced by the provision of the smaller diameter, and either construction may be described as a reducing of the stem.

The invention is not limited to the details of construction, since obviously these may be varied.

What I claim is:—

1. A stop and waste cock, having a shell provided with an integral main valve to control the flow of liquid through the shell and provided with an externally projecting stem, a secondary valve seat constituting a drainage nipple arranged externally upon the shell, and a secondary valve carried by the main valve stem and arranged outside of and exposed to view beyond the shell and operated by the main valve stem and serving to open and close the drainage nipple.

2. A stop and waste cock, having a shell provided with an internal main valve, an operating stem connected to said valve and extending through the shell and providing a passage outside of the shell, a secondary valve applied to the stem outside of and wholly exposed to view beyond the shell and operated directly by said stem, and a drainage nipple wholly external to the shell, and communicating with the shell through the said passage in the stem, and opened and closed automatically by said secondary valve by the closing and opening respectively of the main valve.

3. A stop and waste cock, comprising a shell having a main valve, an operating stem for said valve extending through the shell, a secondary valve carried by said stem outside of and exposed to view beyond the shell, and a drainage nipple opened and closed automatically by said secondary valve by the closing and opening respectively of the main valve, and a flange arranged next to and beyond the secondary valve, the said secondary valve and flange intercepting the outflowing fluid and deflecting it laterally away from the operator.

4. A stop and waste cock, comprising a shell having a main valve, an operating stem thereon extending through the shell, a drainage nipple on the shell through which the valve stem passes and provided with a conical seat exposed to view on the outside of the shell, a secondary conical valve for said drainage nipple carried by the main valve stem outside of and exposed to view beyond the shell, and a flange arranged next to and projecting beyond the secondary valve, the said conical secondary valve and the flange intercepting the drainage water and deflecting it laterally away from the operator.

In testimony whereof I have hereunto set my hand this twenty-ninth day of March, A. D. 1905.

CHARLES S. FRISHMUTH.

Witnesses:
JOSHUA R. MORGAN.
HELEN M. BROWNLEE.

Correction in Letters Patent No. 867,651.

It is hereby certified that in Letters Patent No. 867,651, granted October 8, 1907, upon the application of Charles S. Frishmuth, of Philadelphia, Pennsylvania, for an improvement in "Stop and Waste Cocks," an error appears in the printed specification requiring correction, as follows: In line 90, page 1, the word "integral" should read *internal;* and that the said Letters Patent should be read with this correction therein that the same may conform to the record of the case in the Patent Office.

Signed and sealed this 22d day of October, A. D., 1907.

[SEAL.]

C. C. BILLINGS,
*Acting Commissioner of Patents.*